United States Patent [19]
Goodman, Jr.

[11] Patent Number: 4,624,438
[45] Date of Patent: Nov. 25, 1986

[54] ADJUSTABLE OUTBOARD TRANSOM

[76] Inventor: Charles W. Goodman, Jr., P.O. Box 418, Benton, La. 71006

[21] Appl. No.: 720,294

[22] Filed: Apr. 5, 1985

[51] Int. Cl.[4] .................. F16M 1/02

[52] U.S. Cl. .................. 248/642; 440/2; 440/61

[58] Field of Search .................. 248/642, 641, 640, 643, 248/669, 132; 440/2, 61, 54, 63, 900; 74/506, 577 S, 89.2

[56] References Cited

U.S. PATENT DOCUMENTS

| | | | |
|---|---|---|---|
| 1,300,466 | 4/1919 | O'Connor | 74/506 X |
| 2,716,960 | 9/1955 | McCumber | 248/642 X |
| 3,242,899 | 3/1966 | Hanson | 248/642 X |
| 3,809,343 | 5/1974 | Adams et al. | 248/642 |
| 4,232,627 | 11/1980 | Glenn et al. | 440/61 |
| 4,279,602 | 7/1981 | Alter | 248/642 X |
| 4,482,330 | 11/1984 | Cook | 248/640 X |

*Primary Examiner*—Ramon O. Ramirez
*Attorney, Agent, or Firm*—John M. Harrison

[57] ABSTRACT

An adjustable outboard transom which is characterized by a pair of transom mount brackets bolted in spaced relationship to the transom and a pair of slotted motor mount brackets which support an outboard motor and cooperate with the transom mount brackets in sliding relationship, respectively, for vertical adjustment of the outboard motor. A shaft with a nut on one end rotatably connects the transom mount brackets and a pawl and rachet mechanism cooperates with the shaft to facilitate incremental shaft rotation by applying a wrench to the nut. A pair of cable mounts secured to the motor mount brackets anchor each end of a cable which is wound around the shaft and bolts extend from the cable mounts through the slots in the transom mount brackets, respectively. Raising and lowering of the motor mount brackets and the outboard motor is facilitated by rotation of the shaft to selectively wind and unwind the cable on the shaft.

5 Claims, 6 Drawing Figures

FIG. 1
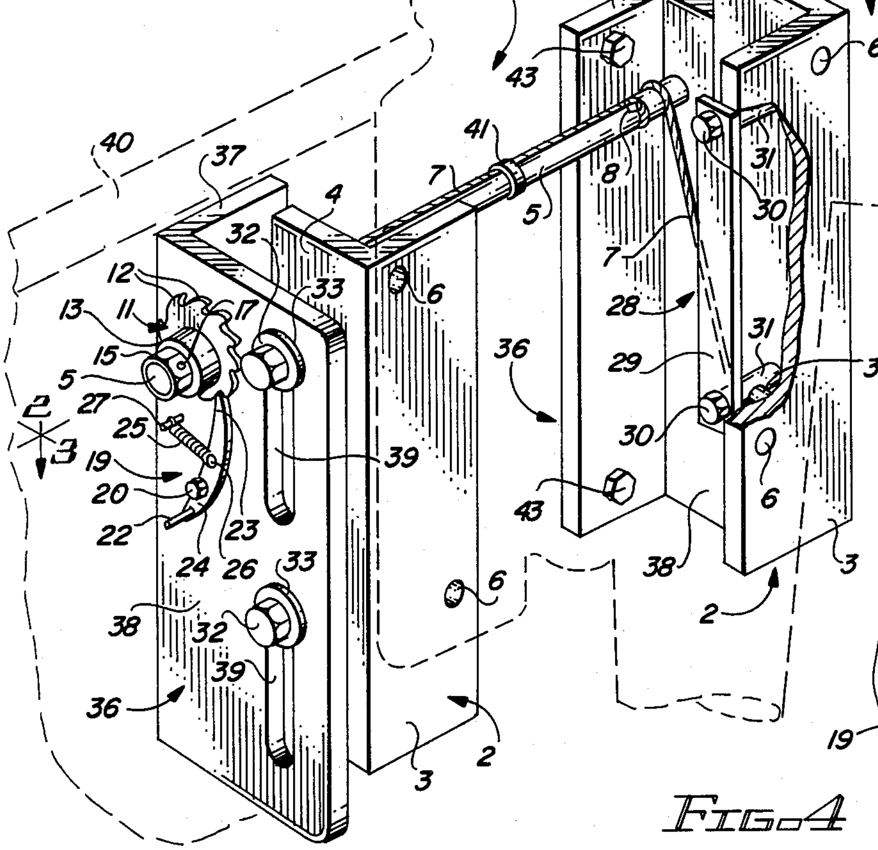
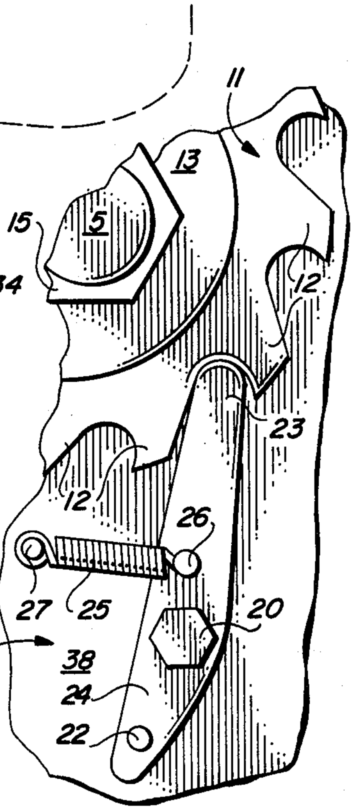
FIG. 4
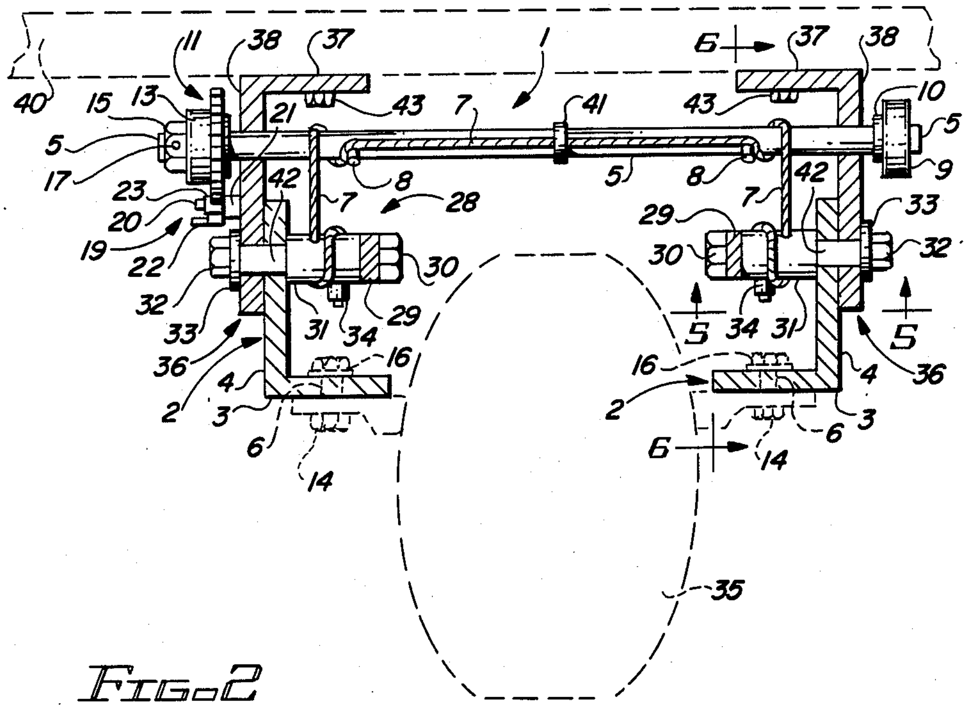
FIG. 2

ADJUSTABLE OUTBOARD TRANSOM

BACKGROUND OF THE INVENTION

1. Field of the Invention

The concept of mounting an outboard motor or engine rearwardly of the transom of a boat on an external transom bracket or outboard transom has been known for some time. Such brackets have long been used on such vessels as sailboats which are dependent upon the wind for power. Small outboard motors are typically mounted on outboard transoms attached to these boats to provide a source of auxiliary power. In recent years, the value of external outboard transom brackets has been realized both to increase boat performance and to create additional space in the boat. With the ever increasing interest in racing, it has been found that outboard transoms can be used to support large outboard motors to good advantage in increasing the speed and handling characteristics of racing boats. Such brackets are simple in design and are sized and fabricated to bolt to the transom of the boats and safely carry an outboard motor of selected size and horsepower.

The performance of a boat is enhanced by an outboard transom because the motor is mounted away from the boat transom and the lower unit of the motor therefore projects into quieter water. Since the water which rushes past the boat hull at the point where the bottom joins the boat transom is forced upwardly, a turbulence develops at this point and extends rearwardly of the boat transom. This turbulence decreases with increasing distance from the boat transom. It is well known that a propellor-driven boat performs best when the propellor is rotating nearest the surface of water which is subjected to minimum turbulence and aeration. This optimum propellor location effects minimum propellor cavitation and ventilation and is realized when the outboard motor is mounted higher than it would normally be positioned on the transom of a boat and is located rearwardly of the transom. This propellor location advantage is increased when the outboard motor is mounted on an external transom bracket or outboard transom which is adjustable such that the motor can be raised or lowered with respect to the boat transom in order to optimize boat performance in any given condition of wind and water.

2. Description of the Prior Art

Several designs for external transom brackets are known in the art. Land and Sea, Inc. of North Salem, N.H., has developed an external transom bracket which includes a transom plate with a hydraulically actuated motor mount bracket for adjusting the height of an outboard motor with respect to the boat transom. A similar device is manufactured by G & M Enterprises, Inc. of El Dorado, Ark. A more simple, manually operated adjustable outboard transom is manufactured by Chaparral Marine Products, Inc. of Onalaska, Tex., which device is characterized by a transom mount plate and a pair of sliding motor mount brackets which are adjustably secured to the transom mount plate. The adjusting mechanism includes a pair of threaded turnbuckles, each having one end secured to a motor mount bracket and the other end attached to the transom mount plate, respectively, with a threaded collar for upward and downward adjustment of the threaded rod and motor mount brackets with respect to the boat transom. Similar manually operated devices have been designed by T-H Marine Supply Company of Madison, Ala. and Performance Plus Company of Torrance, Calif.

It is an object of this invention to provide a new and improved adjustable outboard transom which includes a fixed set of plates attached to the transom of a boat, a pair of cooperating movable plates and a cable wound on a shaft connecting the fixed plates with the ends of the cables attached to the movable plates to facilitate raising and lowering of the movable plates with respect to the fixed plates by selectively winding and unwinding the cable on the shaft.

Another object of the invention is to provide a new and improved adjustable outboard transom bracket which includes a pair of transom mount brackets secured to the transom of a boat and a pair of motor mount brackets in sliding attachment to the transom mount brackets. A shaft rotably joins the transom mount brackets, a cable is wound on the shaft and each end of the cable is anchored to one of the motor mount brackets. A ratchet and pawl mechanism is located in cooperation with the shaft, to facilitate incremental rotation of the shaft and adjustment of the height of the motor mount brackets and outboard motor with respect to the transom mount brackets and the boat transom.

Another object of this invention is to provide a jack plate mechanism or adjustable outboard transom which serves as an external transom bracket for a boat and uses a cable wound on a rotating shaft carried by fixed transom mount brackets to raise and ower a pair of cooperating motor mount plates anchoring the ends of the cable.

Yet another object of the invention is to provide an external transom apparatus for vertical adjustment of an outboard motor, which apparatus includes a pair of slotted transom plates secured to the transom of a boat in spaced relationship and a pair of motor mount plates cooperating in sliding relationship with the transom plates by means of bolts attached to the motor mount plates and extending through the slots in the transom plates and further including a shaft rotatably carried by the transom plates and a cable wound on the shaft and anchored at the ends to the motor mount plates.

Still another object of the invention is to provide an adjustable outboard transom which serves as an external transom bracket and includes a set of movable brackets slidably mounted on a set of fixed brackets secured to the transom of a boat, the slidably mounted, movable brackets relatively movable with respect to the fixed brackets by means of a ratchet and cable mechanism in cooperation with a rotating shaft joining the fixed brackets.

SUMMARY OF THE INVENTION

These and other objects of the invention are provided in an adjustable outboard transom for adjustably supporting an outboard motor, which transom includes a pair of slotted transom brackets bolted to the transom of a boat; a pair of motor mount brackets cooperating with the transom brackets in sliding relationship, respectively, by means of bolts extending from the motor mount brackets through the transom bracket slots; a cable shaft mounted in rotatable relationship in the transom brackets; a ratchet and pawl mechanism cooperating with the cable shaft for incremental rotation of the cable shaft in either direction; a cable wound on the cable shaft and anchored at each end to the motor mount brackets; and a nut threaded on the cable shaft for rotating the cable shaft and selectively winding and unwinding the cable on the cable shaft to incrementally raise and lower the motor mount brackets with respect to the transom brackets.

BRIEF DESCRIPTION OF THE DRAWINGS

The invention will be better understood by reference to the accompanying drawings, wherein:

FIG. 1 is a perspective view, partially in section, of a preferred embodiment of the adjustable outboard transom;

FIG. 2 is a sectional view of the adjustable outboard transom, taken along line 2—2 in FIG. 1;

FIG. 4 is a sectional view of a preferred ratchet and pawl mechanism used in the adjustable outboard transom;

DESCRIPTION OF THE PREFERRED EMBODIMENTS

Figure 3:
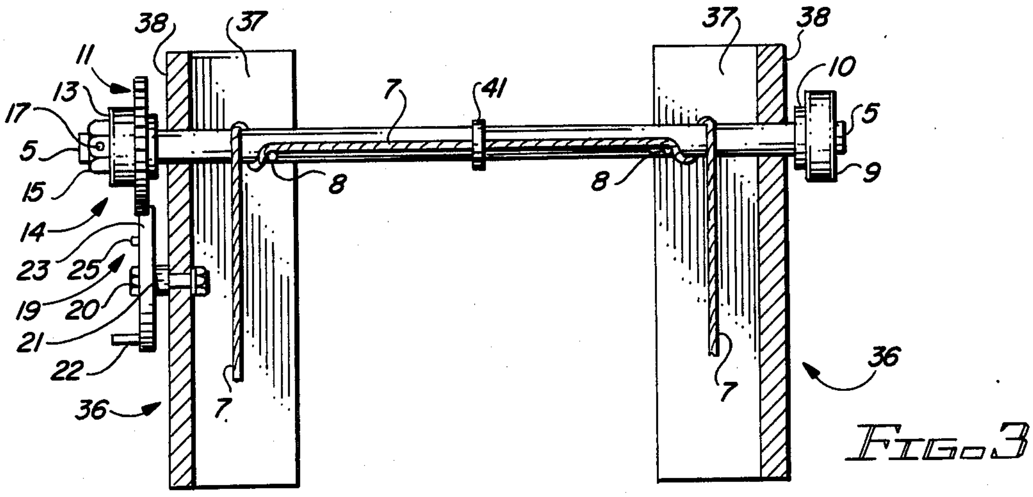
FIG. 3 is a sectional view of the adjustable outboard transom, taken along line 3—3 in FIG. 1.
Figure 5:
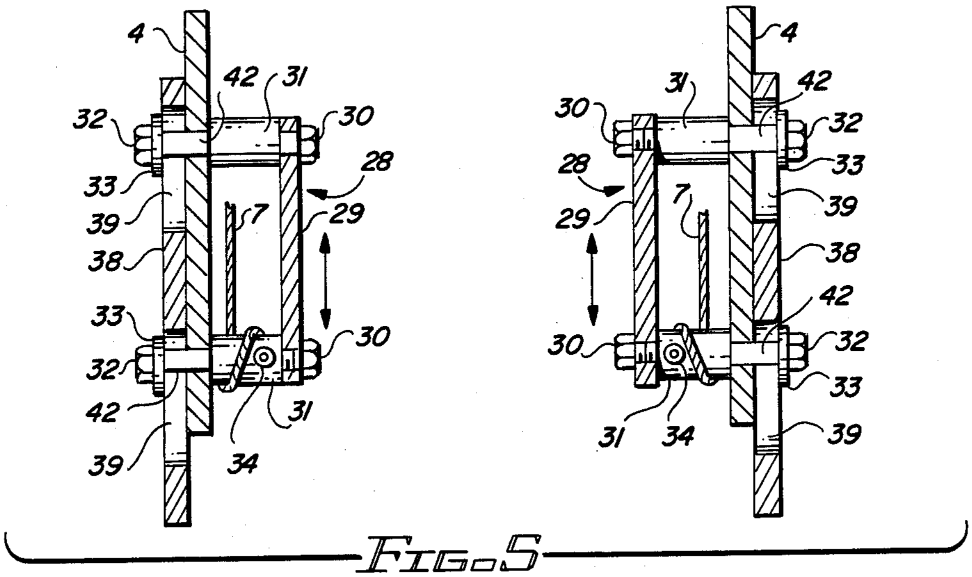
FIG. 5 is an exploded sectional view of the transom mount brackets, motor mount brackets and cable mounts in the adjustable outboard transom.
Figure 6:
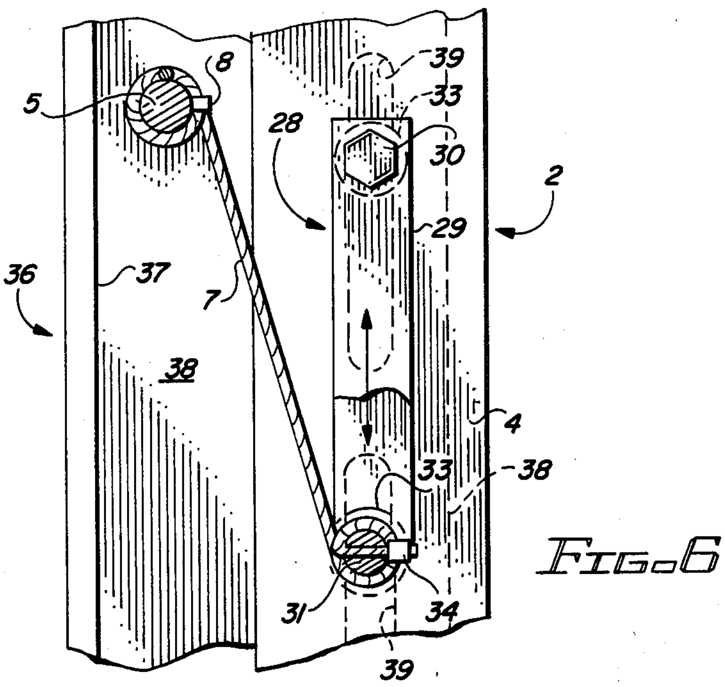
FIG. 6 is a sectional view, taken along line 6—6 in FIG. 2, of one side of the adjustable outboard transom.

Referring initially to FIGS. 1 and 2 of of the drawings, in a preferred embodiment the adjustable outboard transom of this invention is generally illustrated by reference numeral 1. The adjustable outboard transom 1 is characterized by a pair of generally L-shaped motor mount brackets 2, each having a motor mount flange 3 and a lift flange 4. Mount holes 6 are provided in the motor mount flanges 3 in order to secure an outboard motor 35 (illustrated in phantom in FIGS. 1 and 2) to the motor mount flanges 3 by means of motor mount bolts 14 and mount nuts 16, illustrated in FIG. 2. A pair of generally L-shaped transom mount brackets 36 are each characterized by a transom flange 37 and a slotted flange 38. The transom flange 37 is secured to the boat transom 40 (illustrated in phantom in FIGS. 1 and 2) of a boat by means of motor mount bolts 43 and a pair of aligned flange slots 39 of selected length are provided in each of the slotted flanges 38 as illustrated in FIG. 1. A cable shaft 5 is is journaled for rotation in each of the slotted flanges 38 of the transom mount brackets 36 and spans the transom mount brackets 36, as illustrated in FIGS. 1 and 2. Referring to FIGS. 1–3, a shaft stop 9 and shaft washer 10 are provided on one end of the cable shaft 5, while a ratchet 11 is secured to the opposite end of the cable shaft 5 by means of a ratchet drum 13 and a drive nut 15, as illustrated in FIGS. 1–3. The drive nut 15 can be threaded on the cable shaft 5 and in a most preferred embodiment, an allen screw 17 is threaded into the drive nut 15 or a roll pin can be used to secure the drive nut 15 tightly on the cable shaft 5.

As further illustrated in FIGS. 1, 2, 5 and 6 of the drawings a cable mount 28 is secured to each of the lift flanges 4 of the motor mount brackets 2 by means of a pair of sliding bolts 32 and cooperating washers 33, such that the shanks 42 of the sliding bolts 32 register with the flange slots 39 provided in the slotted flanges 38 of the transom mount brackets 36, respectively. The cable mounts 28 are each further characterized by a support strut 29 which extends between and is attached to one end of a pair of parallel bosses 31 by means of support strut bolts 30, respectively. In a preferred embodiment, the support strut bolts 30 are each threaded into the opposite ends of the bosses 31 from the sliding bolts 32. Accordingly, it will be appreciated from a consideration of FIGS. 5 and 6 that the lift flanges 4 are permitted to slide upwardly and downwardly with respect to the slotted flanges 38 due to the positioning of the sliding bolts 32 in the flange slots 39, respectively. As further illustrated in FIGS. 1–3, 5 and 6, one end of a cable 7 is attached by means of a cable clamp 34 to the lower boss 31 in the left hand one of the cable mounts 28 and extends to the end of the cable shaft 5 which is closest to the ratchet 11. The cable 7 is coiled in a three quarter loop around the cable shaft 5 and is looped around a cable pin 8 extending through the cable shaft 5. The cable 7 is then extended linearly along the cable shaft 5 to a second cable pin 8, where the cable 7 is again looped around the cable shaft 5 and is extended downwardly to the lower boss 31 in the second cable mount 28, where it is secured by means of a second cable clamp 34. A cable retainer 41 serves to secure that portion of the cable 7 which extends between the cable pins 8 to the cable shaft 5, as illustrated in FIGS. 1 and 3. Referring again to FIG. 6 of the drawing in a most preferred embodiment of the invention, the ends of the cable 7 are wrapped around the bosses 31 and are projected through an aperture (not illustrated) in the bosses 31 and secured by means of the cable clamps 34, as illustrated.

Referring now to FIGS. 1–4 of the drawings the ratchet 11 and cooperating ratchet drum 13 are fixedly secured to the cable shaft 5 and a pawl 19 is pivotally bolted to the slotted flange 38 of one of the transom mount brackets 36 by means of a pawl bolt 20. The pawl bolt 20 is a shoulder bolt which permits the pawl 19 to rock back and forth with the aid of the cooperating pawl washer 21 and the pawl 19 is further characterized by an engaging end 23 and a release end 24. The engaging end 23 of the pawl 19 is designed to releasably engage the ratchet teeth 12 of the ratchet 11, as is more particularly illustrated in FIG. 4. A spring 25 extends between a pawl spring post 26, attached to the pawl 19 and a flange spring post 27, attached to the slotted flange 38, in order to bias the engaging end 23 of the pawl 19 against the ratchet teeth 12. A finger pin 22 is provided on the release end 24 of the pawl 19 in order to facilitate disengagement of the engaging end 23 from the ratchet teeth 12. Accordingly, it will be appreciated from a consideration of FIGS. 1 and 4 that the engaging end 23 of the pawl 19 can be selectively manipulated to engage the ratchet teeth 12 in the ratchet 11 and allow incremental rotation of the cable shaft 5 with the aid of a conventional wrench, as hereinafter described.

Referring again to the drawings, the adjustable outboard transom 1 is operated by initially placing a conventional wrench (not illustrated) on the drive nut 15. When the motor mount brackets 2 are in the relative position illustrated in FIG. 1 and it is desired to raise the outboard motor 35, pressure is exerted on the conventional wrench to rotate the drive nut 15 and the cable shaft 5 in the counterclockwise direction, to wind the cable 7 on the cable shaft 5 and raise each motor mount bracket 2. In a most preferred embodiment of the invention, the ratchet teeth 12 and the ratchet 11 are spaced and designed such that incremental adjustment of the engaging end 23 of the pawl 19 from one of the ratchet teeth 12 to an adjacent one of the ratchet teeth 12 raises the motor mount brackets 2 and the outboard motor 35 a distance of one quarter of an inch. It will be appreciated, however, that the spacing of the ratchet teeth 12 can be chosen such that the motor mount brackets 2 and outboard motor 35 are raised a selected distance for each incremental movement of the cable shaft 5. It will be further appreciated from a consideration of FIGS. 1 and 4 that this rotation of the drive nut 15 and cable shaft 5 in the counterclockwise direction allows the engaging end 24 of the pawl 19 to slide past the ratchet teeth 12 in succssion. Accordingly, the motor mount brackets 2 and the outboard motor 34 can be raised to a selected height by continuing to rotate the cable shaft 5 in the counterclockwise direction. The maximum height of adjustment of the motor mount brackets 2 with respect to the transom mount brackets 36 is determined by the length of the flange slots 39, which length can be variable, as desired. When the motor mount brackets 2 and outboard motor 35 are raised to the desired height, engagement of the engaging end 23 of the pawl 19 with a selected one of the ratchet teeth 12 secures the outboard motor 35 at the selected height until another height adjustment is desired. At this time, the conventional wrench is again placed on the drive nut 15 and the cable shaft 5 rotated in the counterclockwise direction sufficiently to release pressure from the engaging end 23 of the pawl 19. The finger pin 22 is then grasped and the engaging end 23 of the pawl 19 is rotated on the pawl bolt 20 against the tension of the spring 25, to facilitate uninhibited rotation of the ratchet 11 responsive to clockwise rotation of the conventional wrench. Care must be taken when the conventional wrench is allowed to rotate with the drive nut 15 and the cable shaft 5 when the pawl 19 is released, since reverse or counterclockwise pressure is necessary on the wrench in order to counteract the weight of the outboard motor 35. The wrench and cable shaft 5 are allowed to rotate in the clockwise direction responsive to this weight to unwind the cable 7 from the cable shaft 5 until the motor mount brackets 2 and the outboard motor 35 reach a desired height. Pressure is then released from the finger pin 22 to allow the engaging end 23 od the pawl 19 to again engage a selected one of the ratchet teeth 12. This action again stabilizes the height of the outboard motor 35 until an additional adjustment is required.

Referring again to the drawings, it will be appreciated by those skilled in the art that the adjustable outboard transom 1 of this invention is characterized by convenience and ease in manipulation to secure the outboard motor 35 at a selected height with respect to the boat transom 40 of any boat. Furthermore, the outboard motor 35 can be adjusted in height, both while the boat is located on a trailer and while it is in the water, by simply using a conventional wrench such as a ratchet wrench, to manipulate the drive nut 15 in the counterclockwise or clockwise direction, as heretofore described. It will be further appreciated that movement of the outboard motor 35 in either the upward or downward direction can be effected rapidly, since only a few revolutions of the ratchet 11 are required to effect the desired coiling and uncoiling of the cable 7 on the cable shaft and movement of the outboard motor 35 a maximum distance which corresponds to the length of the flange slots 39. It will further be appreciated that the speed of movement of the motor mount bracket 2 and the outboard motor 35 with respect to the transom mount bracket 36 is also a function of the diameter of the cable shaft 5, which can be chosen according to the motor adjustment speed desired.

The cable mounts 28 can each be characterized by a unitary, generally U-shaped bracket without using the separate support struts 29 and cooperating bosses 31 joined by the support strut bolts 30. However, in a preferred embodiment of the invention the support strut bolts 30 are used to secure one end of each of two bosses 31 to a support strut 29 and the sliding bolts 32 are threadably inserted in the opposite ends, respectively, of the bosses 31, in order to facilitate contact between the smooth shanks 42 of the sliding bolts 32 and the inside surfaces of the flange slot 39, to prevent binding during the raising and lowering process. The washers 33 serve to further facilitate smooth transition of the sliding bolts 32 through the slots 39.

While it will be appreciated that various materials can be used in the fabrication of the adjustable outboard transom 1, a chief advantage in the design facilitates use of a higher quality aluminum than is possible in other units which require welding. Referring again to the drawings, both the motor mount brackets 2 and the transom mount brackets 36 are characterized by unitary L-brackets which require no welding for fabrication and can therefore be fabricated of such materials as 70 series aluminum alloy having a superior tensile strength of about 78,000 pounds per square inch. It will be recognized that aluminum is a preferred material of construction for the adjustable outboard transom 1, since it does not easily corrode and has a high strength-to weight ratio. Furthermore, the adjustable outboard transom 1 facilitates mounting of an outboard motor 35 of any design in the same relative position of height with respect to the boat transom 40 as if directly mounted, because of the aligned flange slots 39. Another advantage in the adjustable outboard transom 1 of this invention is the use of a single conventional wrench to manipulate the cable shaft 5. Accordingly, no "back-up" wrench is required to hold a bolt head while a primary wrench is used to manipulate the bolt nut to complete the adjusting process, as is required in prior art devices. It will be further recognized that the adjustable outboard transom 1 of this invention is much cheaper to manufacture than the hydraulically operated counterparts, due to the absence of the hydraulic cylinders and associated equipment. Furthermore, as heretofore noted, the adjustable outboard transom 1 is designed to facilitate much more rapid height adjustment than is possible with the conventional threaded bolt adjusting mechanisms. The cable 7 can also be characterized by any flexible, elongated material such as steel cable, vinyl coated cable, straps or belting of any width and thickness, in non-exclusive particular.

While the preferred embodiments of the invention have been described above, it will be recognized and understood that various modifications may be made therein and the appended claims are intended to cover all such modifications which may fall within the spirit and scope of the invention.

Having described my invention with the particularly set forth above, what is claimed is:

1. An adjustable outboard transom for mounting on a boat transom and adjustably raising and lowering an outboard motor, comprising:

(a) a first generally L-shaped fixed bracket having a first slotted flange projecting from the boat transom and a first transom flange fixedly secured to the boat transom and a second generally L-shaped fixed bracket having a second slotted flange projecting from the boat transom and a second transom flange fixedly secured to the boat transom in spaced relationship with respect to said first transom flange;

(b) at least one first slot provided longitudinally in said first slotted flange and at least one second slot provided longitudinally in said second slotted flange;

(c) a first generally L-shaped motor mount bracket having a first lift flange slidably disposed adjacent said first slotted flange and a first motor mount flange extending in essentially parallel relationship with respect to the boat transom and a second generally L-shaped motor mount bracket having a second lift flange slidably disposed adjacent said second slotted flange and a second motor mount flange extending in essentially parallel relationship with respect to the boat transom;

(d) first cable mount means carried by said first lift flange and slidably cooperating with said at least one first slot and second cable mount means carried by said second lift flange and slidably cooperating with said at least one second slot;

(e) a cable shaft rotatably carried by said first slotted flange and said second slotted flange;

(f) a pair of cable pins projecting transversely from said cable shaft in spaced relationship; and (g) a flexible cable at least partially wound on said cable shaft between said cable pins and the ends of said cable shaft, respectively, with said flexible cable engaging said cable pins and a segment of said flexible cable extending between said cable pins and one end of said flexible cable fixedly attached to said first cable mount means and the opposite end of said cable fixedly attached to said second cable mount means whereby said first motor mount bracket and said second motor mount bracket are selectively raised and lowered in concert with respect to said first fixed bracket and said second fixed bracket when said cable shaft is rotated and said flexible cable is selectively wound and unwound on said cable shaft.

2. The adjustable outboard transom of claim 1 further comprising ratchet and pawl means provided in cooperation with said cable shaft for incremental rotational adjustment of said cable shaft.

3. The adjustable outboard transom of claim 1 further comprising a drive nut secured to one end of said cable shaft for rotation of said cable shaft in a selected direction.

4. The adjustable outboard transom of claim 1 further comprising;

(a) ratchet and pawl means provided in cooperation with said cable shaft for incremental relational adjustment of said cable shaft; and (b) a drive nut secured to one end of said cable shaft for rotation of said cable shaft in a selected direction.

5. The adjustable outboard transom of claim 4 wherein said ratchet and pawl means are further characterized by a ratchet fixedly attached to said one end of said cable shaft and a pawl pivotally carried by said slotted flange located adjacent said ratchet, with one end of said pawl biased into contact with said ratchet to maintain said motor mount brackets in a selected position with respect to said transom mount brackets.

* * * * *